Jan. 18, 1966  B. B. MATZENAUER  3,229,614
ELECTRIC TOASTER
Filed Sept. 18, 1963  4 Sheets-Sheet 1

INVENTOR
BROTHER BERARD MATZENAUER

BY Kenyon & Kenyon
ATTORNEYS

Jan. 18, 1966     B. B. MATZENAUER     3,229,614
ELECTRIC TOASTER
Filed Sept. 18, 1963                                                                        4 Sheets-Sheet 4

INVENTOR
BROTHER BERARD MATZENAUER

BY *Kenyon & Kenyon*

ATTORNEYS

United States Patent Office 3,229,614
Patented Jan. 18, 1966

1

3,229,614
ELECTRIC TOASTER
Berard Matzenauer, St. Bonaventure Monastery,
174 Ramsey St., Paterson, N.J.
Filed Sept. 18, 1963, Ser. No. 309,714
3 Claims. (Cl. 99—327)

The present application is a continuation-in-part of my copending application Serial No. 280,605 filed in the Patent Office on May 15, 1963.

This invention relates to an electric toaster. It relates particularly to an electric toaster which is capable of toasting a large number of slices of bread simultaneously. It relates more particularly to an electric toaster of the kind described which discharges slices of toasted bread downwardly, that is, through its bottom. It relates still more particularly to such an electric toaster having a bottom cover for its heating element assembly installed and equipped for at least semi-automatic operation to facilitate the discharging of toast, and it relates even still more particularly to an electric toaster having the foregoing components and characteristics which is adapted to cooperate with a toast basket by automatically discharging slices of toasted bread into the same at the end of the toasting period.

It is an object of the present invention to provide an electric toaster having a heating element assembly and a bottom cover therefor which is shiftable into open or toast-discharging position by solenoid action upon completion of the toasting period, and having further an electric circuit for its heating elements and bottom cover solenoid and an associated mechanical operating mechanism such that there is automatic resetting of the electric circuit after each toasting and toast-discharging cycle to allow the commencement of another cycle merely by the throwing of a single switch.

This and other objects of the present invention as well as its advantages, nature, and substance will be more clearly perceived and fully understood by referring to the following description and claims taken in connection with the accompanying drawings in which:

Figure 1:
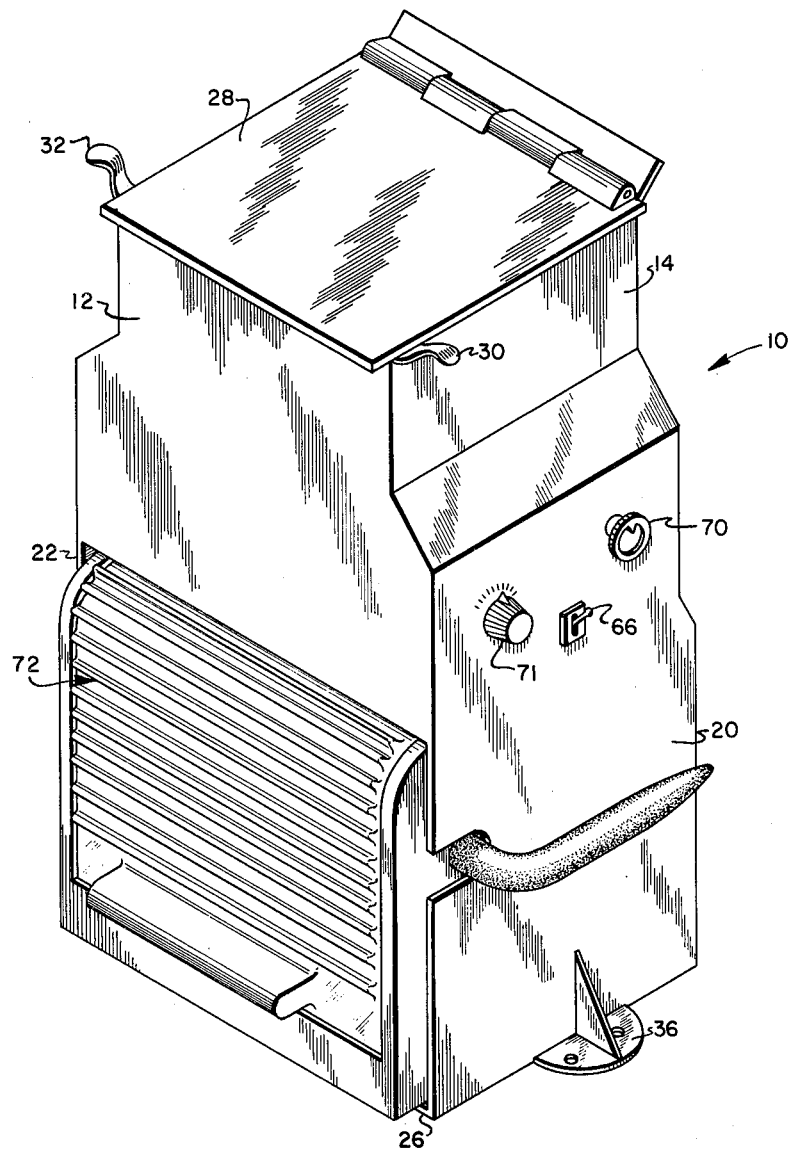
FIG. 1 represents an isometric view of the exterior of the electric toaster of this invention.
Figure 2:
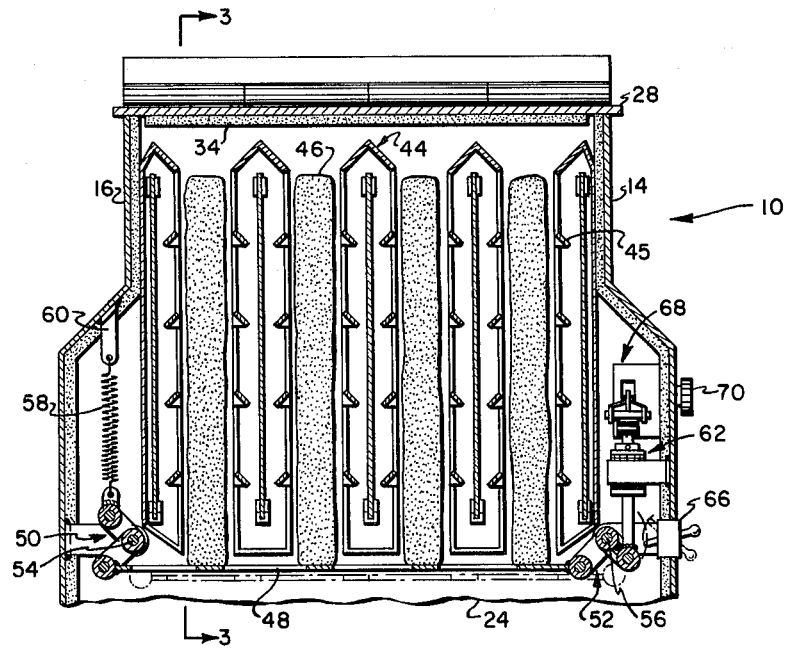
FIG. 2 represents a view in front sectional elevation of the upper portion of the electric toaster of FIG. 1 taken along line 2—2 in FIG. 3 looking in the direction of the arrows, the toaster being loaded with a plurality of slices of bread in toasting position.
Figure 3:
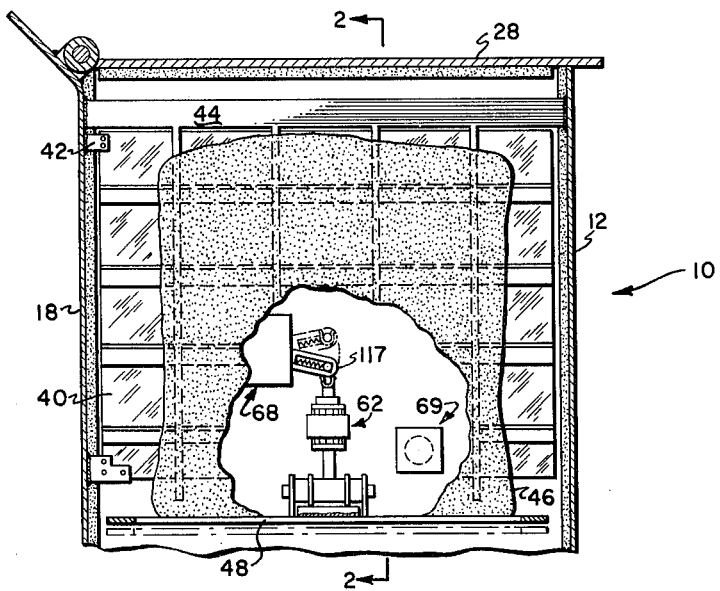
FIG. 3 represents a view in side sectional elevation of the upper portion of the electric toaster of FIG. 1 taken along line 3—3 in FIG. 2 looking in the direction of the arrows, a portion of the structure being broken away to show part of the operating mechanism of the bottom cover of the heating elements.

Referring now to the drawings in detail, especially FIGS. 1, 2, and 3 thereof, an embodiment of the electric toaster of this invention is generally designated 10. Toaster 10 has a structural casing comprising an upper front panel 12, upper side panels 14 and 16, upper back panel 18, lower side panels 20 and 22, lower back panel 24, and bottom panel 26. It is provided with a top cover or lid 28 which is hinged to a slanting upper portion of upper back panel 18, and which in lowered position seats in essentially gap-free relation on and along the upper edges of panels 12, 14 and 16. Lid 28 has lifting handles 30 and 32 on its lateral edges. Panels 12, 14, 16, 18 and lid 28 are internally insulated with suitable sheet-like material such as asbestos sheet. A layer of this material on the under side of lid 28 is designated 34. In a more elaborate form of construction, metal sheathing may be applied inside of the insulation. Securing bracket 36 and a similar oppositely located bracket not shown are provided at the bottom of the toaster for use when the toaster is to be more or less permanently fastened in place on, for example, a table top or kitchen counter.

Within the upper portion of the toaster casing defined by panels 12, 14, 16 and 18 are a plurality of heating elements 40 in the form of grids of wire of appropriate resistance. These elements which are of generally rectangular overall shape are supported between upper front and upper back panels 12 and 18 by means of brackets 42. Enclosing the heating elements individually are a plurality of spacer guides generally designated 44. These guides are peaked at their upper ends and of gridlike configuration in their side portions, and are mounted to the upper front and upper back panels of the toaster casing. They serve to separate the toasting slices of bread 46 one from another and provide them with extensive two-side exposure to the heating elements. Their horizontal elements 45 slant inwardly and downwardly as heat deflectors.

While in toasting position, bread slices 46 are supported on the slat portions of a slotted plate 48 constituting a bottom cover for the plurality of heating elements or heating element assembly. Plate 48 itself is supported through rotatable connections with and from bell crank lever assemblies generally designated 50 and 52 whose pivot shafts 54 and 56 are mounted in suitable brackets or struts in the toaster casing. The end of lever assembly 50 distant from the assembly's connection to plate 48 is attached through a tension spring 58 to a spring post 60 mounted on and within the toaster casing. The end of lever assembly 52 distant from the assembly's connection to plate 48 is rotatably and slidably connected to the lower end of the plunger element of an electric solenoid generally designated 62, the coil element of which is fixedly mounted in the toaster casing. The nature of the connection of bell crank lever assembly 52 to the plunger element of electric solenoid is explained in greater detail hereinafter with reference to FIG. 4.

When there is no current flowing in the coil element of solenoid 62, the pull of spring 58 holds slotted plate or heating element assembly bottom cover 48 in its position shown in solid outline in FIGS. 2 and 3, that is, with its slat portions in between spacer guides 44 to support slices of bread 46 in toasting position. When there is current flowing in the coil element of solenoid 62; that is, when the solenoid is energized, the solenoid plunger element is drawn upwardly, and slotted plate 48 is shifted to the right against the pull of spring 58 beyond the intermediate position in which it is shown in dashed outline in FIGS. 2 and 3. When the heating assembly bottom cover is fully to the right, its slots or open regions are in between spacer guides 44, and toast or bread slices originally held in toasting position between the spacer guides on the slats of plate 48 can drop through the slots in the plate for discharge from the upper or heating element portion of toaster 10.

Mounted on the right hand side of toaster 10 is an electrical switch 66 of the toggle or on-off kind, the function of which is explained hereinafter. The normal condition of this switch is simply that into which it has last been put, that is, either closed or open, or "on" or "off." The operating lever of switch 66 extends beyond the switch on two sides; that is, it may be manipulated not only from outside but also from inside of the toaster casing. When the portion of the operating lever outside the toaster casing is snapped upwardly, and the portion of it inside the casing is correspondingly depressed, switch 66 is thrown into a closed or "on" condition.

Supposing that the switch is in this condition and supposing also that solenoid 62 is energized to draw up its plunger element, the outer swinging end of bell crank lever assembly 52 will strike the depressed inner end of the operating lever of switch 66 and throw this switch into an open or "off" condition. The operating lever of the switch will, however, then be left in such a position that it is clear of bell crank lever assembly 52; that is, a downward or clockwise swing of this assembly will not cause it to strike the operating lever of switch 66 and throw this switch back into the closed or "on" condition.

Mounted on the right hand side of toaster 10 quite close to switch 66 are a timing and electrical contact-making device generally designated 68 and a thermostatic switch generally designated 69, the structure and function of which are explained hereinafter. It may be said here, however, that switch 69 is of such nature that its contact points are open at normal or room temperatures and closed at elevated temperatures. Contact-making device 68 and switch 69 have externally adjustable timing adjustment or setting knobs 70 and 71 respectively. In the case of switch 69, adjustment of knob 71 raises or lowers the temperature to which the switch must be heated for its contact points to close, or down to which it must be cooled for them to open.

Within the lower portion of the toaster casing defined by panels 20, 22, 24 and 26 there is withdrawably installed a toast-receiving basket generally designated 72. This basket is contemplated to be essentially similar in construction and operation to the toast-receiving basket of similar number fully illustrated and described in my co-pending application Serial No. 280,605 mentioned hereinbefore.

Figure 4:
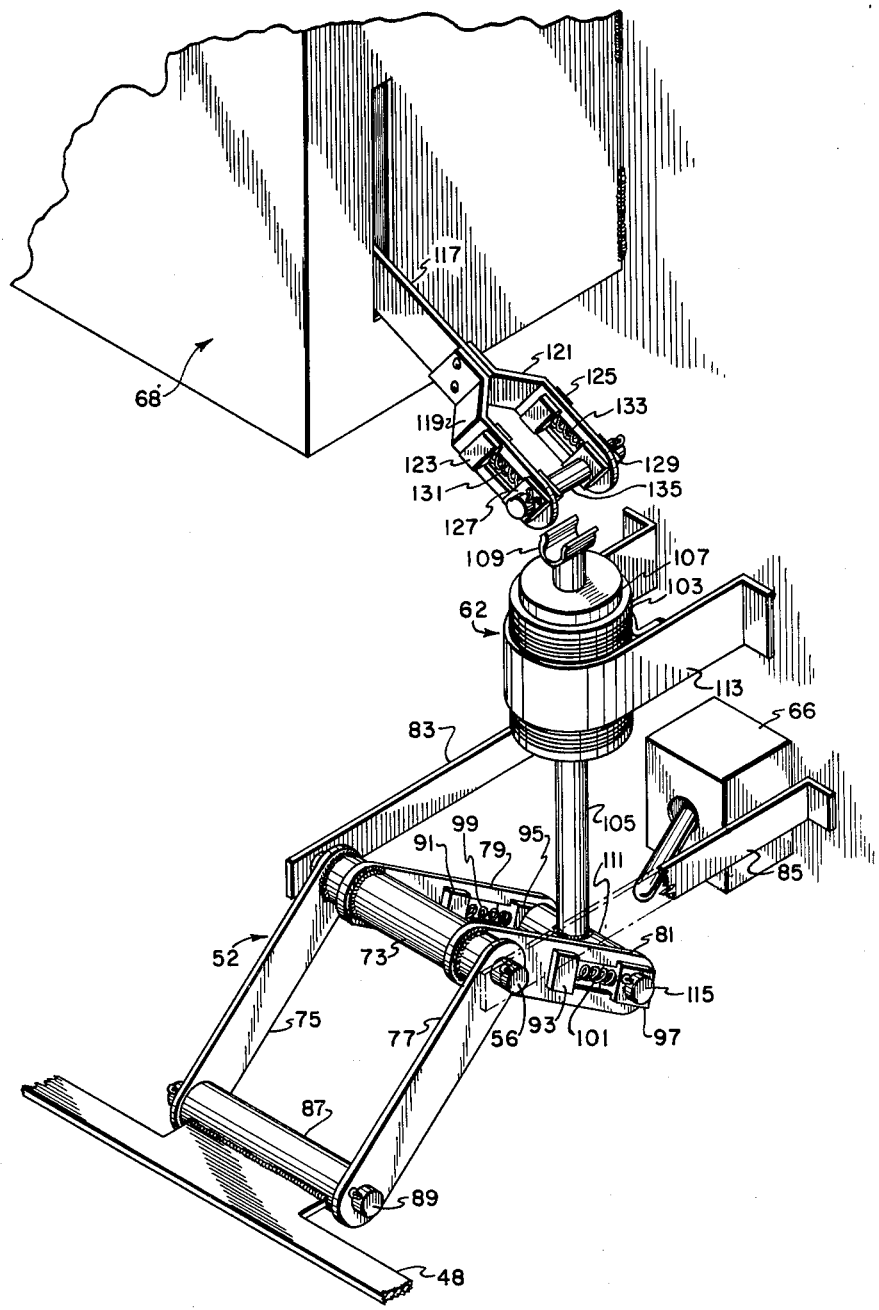
FIG. 4 represents an isometric view of part of the operating mechanism of the bottom cover of the heating elements, particularly showing the arrangements whereby the plunger element of the bottom cover operating solenoid is allowed to have directly vertical motion, and to become engaged with and disengaged from the armature element of the toaster's timing and electrical contact-making device.

Referring next to FIGS. 3 and 4, bell crank lever assembly 52 comprises a sleeve member 73, a first pair of parallel arms 75 and 77 extending from the sleeve member, and a second pair of parallel arms 79 and 81 likewise extending from the sleeve at about a right angle to the first pair. The connections between arms 75, 77, 79, and 81 and sleeve 73 are rigid connections. Support for lever assembly 52 is provided by brackets or struts 83 and 85 extending inwardly from toaster casing panel 14 and shaft or pin 56 passing through these struts and through sleeve 73. Effectively, bell crank lever assembly 52 is rotatable between the outer ends of struts 83 and 85.

The outer ends of arms 75 and 77 fit closely around the ends of a sleeve 87 which is fixedly attached to the right hand edge of heating element bottom cover plate 48. A pivot pin 89 extends through and provides a rotatable connection between sleeve 87 and arms 75 and 77. Pin 89 may either be primarily rotatable in sleeve 87 and have a fairly tight fit in arms 75 or 77, or turn in the arms and be tight in the sleeve, or else be rotatable in both the arms and the sleeve depending upon design and manufacturing convenience. Similarly, pin 56 may either be primarily rotatable in sleeve 73 and have a fairly tight fit in struts 83 and 85, or turn in the struts and be tight in the sleeve, or else be rotatable in both the struts and the sleeve.

In their right hand portions, arms 79 and 81 of lever assembly 52 are longitudinally slotted to accommodate, respectively, spring banking blocks 91 and 93 and pivot pin mounting blocks 95 and 97. The mounting blocks are slidable in the slots in arms 79 and 81. Spring 99 between banking block 91 and mounting block 95 and spring 101 between banking block 93 and mounting block 97 exert at least light pressure upon the pivot pin mounting blocks to urge them rightwardly in the arm slots, that is, toward the outer ends of arms 79 and 81.

Electric solenoid 62 comprises a coil element 103, a plunger element 105, a travel limiting collar 107 affixed to the plunger element above the coil element, and a U-shaped spring clip 109 and a sleeve member 111 affixed to the plunger element at its upper and lower ends respectively. The whole electric solenoid assembly is supported from toaster casing panel 14 by means of a bracket 113. Sleeve member 111 fits closely between pivot pin mounting blocks 95 and 97 in bell crank lever arms 79 and 81. A pivot pin 115 extends through and provides a rotatable connection between sleeve 111 and blocks 95 and 97. Pin 115 may either be primarily rotatable in sleeve 111 and have a fairly tight fit in blocks 95 and 97, or turn in the blocks and be tight in the sleeve, or else be rotatable in both the blocks and the sleeve depending upon design and manufacturing convenience.

Extending out of a slot in the front side of timing and electrical contact-making device 68 above electric solenoid 62 is a lever 117 which constitutes a mechanical operating extension of an electrical armature 104 illustrated in and described in connection with FIGS. 5, 6 and 7. Lever 117 is of forked configuration at its outer end. This configuration is provided by jogged strip elements 119 and 121 which are riveted or otherwise rigidly affixed to lever 117. In their outer or forward portions, strip elements 119 and 121 are longitudinally slotted to accommodate, respectively, spring banking blocks 123 and 125 and latching pin mounting blocks 127 and 129. The mounting blocks are slidable in the slots in strip elements 119 and 121. Spring 131 between banking block 123 and mounting block 127 and spring 133 between banking block 125 and mounting block 129, exert at least light pressure upon the latching pin mounting blocks to urge them forwardly in the strip element slots, that is, toward the outer ends of the strip elements.

A latching pin 135 extends through and between mounting blocks 127 and 129. This pin may be rotatable in these blocks but is not necessarily so. The open end of spring clip 109 is oriented longitudinally in parallel with latching pin 135 which has a length between mounting blocks and a diameter matched with the length and opening width of the spring clip to let the clip make a fairly snug snapping engagement around the pin upon the pin and the clip being pressed together. With lever 117 in fully raised position and latching pin mounting blocks 127 and 129 pressed all the way out in the slots in strip elements 119 and 121 on this lever, latching pin 135 should be essentially directly above spring clip 109. The upward stroke of solenoid plunger element 105 is such that it can drive clip 109 into engagement with pin 135 when lever 117 is fully raised. With both lever 117 and plunger element 105 in their fully lowered positions, on the other hand, spring clip 109 is out of engagement with latching pin 135 as shown in FIGS. 3 and 4.

Figure 5:
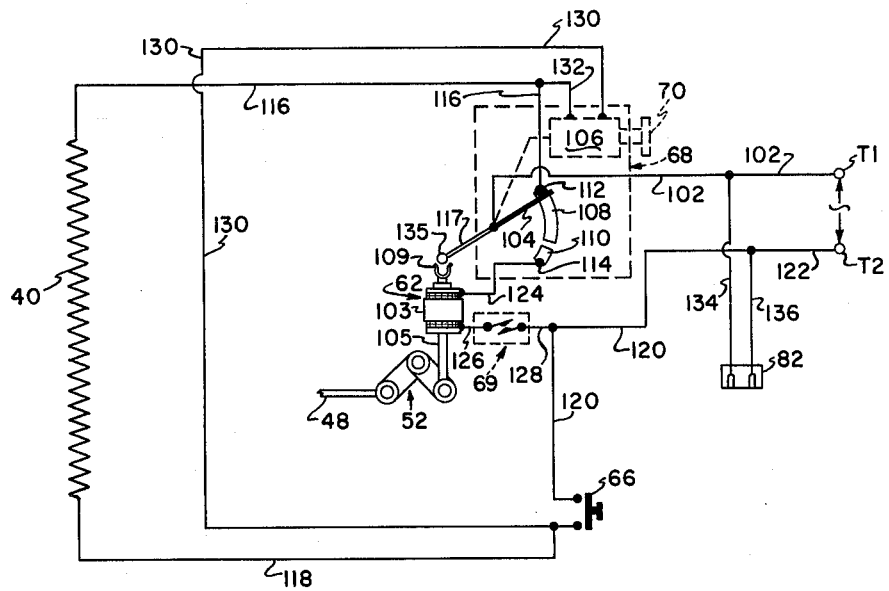
FIG. 5 represents a schematic wiring diagram of the toaster, including some mechanical structure, showing conditions just before a manually-operated switch is closed to start a toasting period.

Referring next to FIG. 5, $T_1$ and $T_2$ represent the external terminals or wiring connections of toaster 10, these terminals not being shown in the structural drawings, wherethrough electrical power from a suitable source may be applied to the toaster. From terminal $T_1$, internal wiring element 102 of the toaster leads to armature 104 which is part of timing and electrical contact-making device 68, and which has a mechanical operating extension in the form of lever 117 as aforesaid. Armature 104 is also connected mechanically to and driven by a timing mechanism 106 within device 68 which may be set or reset by means of knob 70. Electrically, armature 104 is connected or connectable to arcuately formed contact strips 108 and 110 which are not connected to each other. One extremity of the armature's travel is determined by post 112. When the armature is against this post, it is in electrical contact with strip 108. The other extremity of the armature's travel is determined by post 114. When the armature is against this post, it is in electrical contact with strip 110.

Strip 108 is connected to terminal $T_2$ through wire 116, heating elements 40, wire 118, manually and solenoid operated switch 66, and wires 120 and 122. Strip 110, which is considerably shorter than strip 108, is connected to terminal $T_2$ through wire 124, coil element 103 of solenoid 62, wire 126, thermostatic switch 69, wire 128, and wires 120 and 122. Timing mechanism 106 is of the electrically triggered kind, and is connected across heating elements 40 by wires 130 and 132 to receive electrical triggering power or pulses. Female plug 82 through which power is supplied to the heating elements of toast-receiving basket 72 as described in my co-pending application Serial No. 280,605 is connected across terminals $T_1$ and $T_2$ by wires 134 and 136 joined to wires 102 and 122, respectively.

To consider the operation of toaster 10, imagine that lid 28 is in raised position; that the operating lever of switch 66 is turned to "off"; that there is no bread in the toaster; that the toaster structure including thermostatic switch 69 is at room temperature so that the contact points of this switch are open; that knob 70 is in a position showing maximum time on timing and electrical contact-making device 68, this corresponding to the condition of armature 104 being fully raised against post 112 and lever 117 being fully lowered as shown in FIG. 5; that solenoid 62 is deenergized so that its plunger element 105 is fully lowered on account of the pull of spring 58 exerted through bell crank lever assembly 50, bottom cover plate 48, and bell crank lever assembly 52 with spring clip 109 accordingly being disengaged from latching pin 135; that toast-receiving basket 72 is fully withdrawn from and outside of the toaster, and that terminals $T_1$ and $T_2$ are connected to a suitable source of electric power.

As a first step, toast-receiving basket 72 is brought up and inserted all the way into the lower portion of the toaster casing. The lid of the basket if initially closed, either fully or partialy, will be fully opened automatically in the course of the insertion, and a male electrical plug on the basket will make connection with female plug 82 in the toaster to energize heating coils forming part of the basket structure. All this will happen as explained in my co-pending application Serial No. 280,605 mentioned hereinbefore.

Next, slices of bread 46 are dropped down in between spacer guides 44, and come to rest on the slat portions of heating element assembly bottom cover plate 48. Next, toaster lid 28 is closed. Next, the operating lever of switch 66 is turned to "on." One effect of the last-described step is to complete the electrical circuit through heating elements 40. Consequently, these elements start to warm up and toasting of the bread is commenced. Another effect of it is to send triggering current to timing mechanism 106 and start this mechanism running with accompanying return rotation of knob 70, downward sweep of armature 104 across contact strip 108 toward contact strip 110, and rising of armature extension lever 117. Still another effect, this consequent to the warming up of heating elements 40 and other structure and the atmosphere within the upper portion of the toaster casing, is the raising in temperature of thermostatic switch 69 to the temperature at which its contact points go closed.

Figure 6:
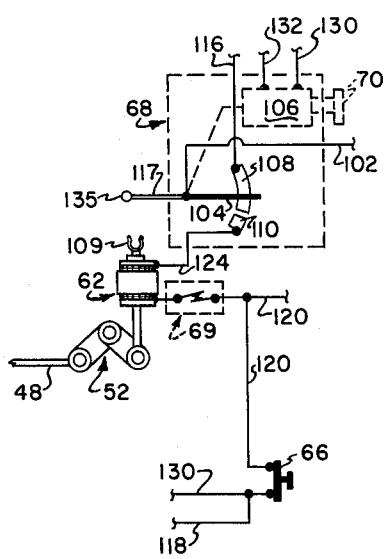
FIG. 6 represents a fragmentary portion of the diagram of FIG. 5 showing conditions part way through a toasting period of those elements which change condition.
Figure 7:
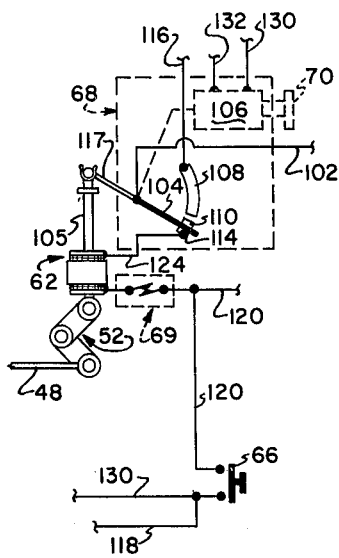
FIG. 7 represents the same fragmentary portion of the diagram of FIG. 5 as FIG. 6 showing conditions at the end of the toasting period with the bottom cover operating solenoid energized to allow the discharge of slices of toast.

An intermediate condition of a portion of the electrical circuit of toaster 10 during a toasting period is shown in FIG. 6 where manually operated switch 66 is in closed or "on" condition; armature 104 has run part way down contact strip 108 with consequent partial rising of lever 117, and the contact points of thermostatic switch 69 are closed.

Armature 104 will run off of strip 108 and slide into strip 110 at about the same time. The precise relative timing of these events is not critical for purposes of this invention to the extent that the armature may go out of contact with strip 108 either slightly before or slightly after it comes into contact with strip 110. It is necessary, however, that at some time the armature be in contact with strip 110 and not in contact with strip 108. When the armature does go out of contact with strip 108, the circuit through heating elements 40 is broken, and these elements begin to cool down. Correspondingly, when the armature does come in contact with strip 110 while thermostatic switch 69 is still closed, the circuit through coil element 103 of solenoid 62 is completed, and the solenoid plunger element is pulled upwardly.

Upward movement of solenoid plunger element 105 has the effect of shifting plate 48 rightwardly against the pull of spring 58 as aforedescribed, and removing the slat support for what are now toast slices to allow all of these slices to fall simultaneously through the slotted regions of plate 48 into toast-receiving basket 72. Upward movement of the plunger element of solenoid 62 also has the effect of throwing switch 66 into an "off" condition as likewise aforedescribed. As it nears the end of its upward stroke, plunger element 105 will drive spring clip 109 into engagement with latching pin 135 to achieve the conditions shown in FIG. 7 wherein, it is to be noted, armature 104 is banked against post 114 and the contact points of thermostatic switch 69 are still closed.

As the internal structure and atmosphere of toaster 10 cools down, however, thermostatic switch 69 will fall in temperature to a level at which its contact points will open, and when this happens the circuit through coil element 103 of electric solenoid 62 is broken; the upward magnetic pull on the solenoid plunger element is terminated, and plate 48 is restored to its left hand position shown in solid outline in FIG. 2 by the pull of tension spring 58. Another thing that happens is that as solenoid plunger element 105 descends under the pull of spring 58 as well as the influence of gravity it pulls down lever 117 because of the engagement of spring clip 109 with latching pin 135. As lever 117 is pulled down, armature 104 is swung back up with accompanying back rotation of knob 70 and comes to rest against post 112. When upward motion of the armature and corresponding downward motion of lever 117 are stopped, solenoid plunger element 105 has not completed its own downward travel and so spring clip 109 is pulled out of engagement with latching pin 135, and the conditions shown in FIG. 5 are restored.

The next step in toaster operation is to withdraw toast-receiving basket 72 from the toaster. The lid of the basket is drawn closed automatically, and the toast within the basket is maintained warm for at least a while because of the thermally insulated wall structure of the basket and the previous heating effect of electrical resistance wires in the basket's bottom. Finally, toaster lid 28 is opened to allow the loading of fresh slices of bread 46 and a repetition of the toasting and toast discharging and withdrawing operation as described.

For satisfactory operation of the toaster, the setting of thermostatic switch 69 should be such that the temperature at which its contact points open on a cooling cycle is sufficiently low that the electric circuit through solenoid coil element 103 for the holding of slotted plate 48 in its right hand position (FIG. 7) is maintained long enough for all toast slices and accompanying crumbs to fall cleanly through the plate's slotted regions. On the other hand, this tempertaure should not be so low that the length of time required to reach it on a cooling cycle is unduly long to the extent of imposing a delay on toaster reloading operations by plate 48 being held out of place for supporting fresh slices of bread on its slats between the several spacer guides 44.

It has been stated hereinbefore that it is an object of the present invention to provide an electric toaster having a heating element assembly and a bottom cover therefor which is shiftable into open or toast-discharging position by solenoid action upon completion of the toasting period, and having further an electrical circuit for its heating elements and bottom cover solenoid and an associated mechanical operating mechanism such that there is automatic resetting of the electric circuit after each toasting and toast-discharging cycle to allow the commencement of another cycle merely by the throwing of a single switch. The achievement of this object is believed to have been made clear, for with the afore-described evolution of conditions of the electrical circuit and its associated operating mechanism from those of FIG. 5 through those of FIGS. 6 and 7 back to those of FIG. 5 all that is needed to restart the cycle of operations is the closing of toggle switch 66.

Protection by Letters Patent of this invention in all its aspects as the same are defined in the appended claims is sought to the greatest extent that the prior art allows.

What is claimed is:

1. An electric toaster comprising (1) a casing having an upper inlet opening for the loading of slices of bread into said toaster and a lower outlet opening for the withdrawing of slices of toast from said toaster, (2) a plurality of heating elements within said casing in such spaced relation one with another to accommodate slices of bread in vertical orientation between adjacent elements, said slices being loaded between said elements through the inlet opening in said casing, (3) a bottom cover plate for said heating elements, said plate being sidewisedly shiftably mounted within said casing and further being characterized by a plurality of slotted regions separated by a plurality of slat portions, said slat portions being disposed to support slices of bread in toasting position between said heating elements in one position of sidewise shifting of said bottom cover plate and said slotted regions being disposed to allow slices of toast to drop through them from between said heating elements toward the outlet opening in said casing in another position of sidewise shifting of said bottom cover plate, (4) spring biasing means connected between said casing and said bottom cover plate for said heating elements whereby said bottom cover plate is maintained normally in its position of sidewise shifting in which its slat portions are disposed to support slices of bread in toasting position between said heating elements, (5) electric solenoid operating means connected between said casing and said bottom cover plate for said heating elements whereby said bottom cover plate may be shifted against the force of said spring biasing means into its position in which its slotted regions are disposed to allow slices of toast to drop through them from between said heating elements toward the lower outlet opening of said toaster, and (6) an electrical system including (i) a timing and electrical contact making device whereby an electrical circuit may be completed through said heating elements for a determinate toasting period and subsequently an electrical circuit completed through the coil element of said electric solenoid operating means, the circuit through said heating elements having been interrupted, (ii) a manually operable on-off switch in the particular portion of the system wherethrough electrical power is supplied to the heating elements, said on-off switch being so mounted in the toaster casing that when it is in the "on" condition its operating lever is disposed to be struck by action of said electric solenoid operating means in the course of this means shifting said bottom cover plate for said heating elements against the force of said spring biasing means and said on-off switch resultingly be thrown into the "off" condition, and (iii) a thermostatic switch in the particular portion of the system wherethrough electrical power is supplied to the coil element of said electric solenoid operating means, said thermostatic switch being so mounted in the toaster casing and being of such a nature that its contact points are normally open at relatively low temperatures; that is, when the heating elements are deenergized, and closed at relatively high temperatures; that is, when the heating elements are energized, and (7) mechanical operating means whereby said electrical system is automatically reset after each toasting and toast discharging period to place said timing and electrical contact making device in starting condition with said manually operable on-off switch in "off" condition, said thermostatic switch in open condition, and said bottom cover plate for said heating elements in its position of sidewise shifting in which its slat portions are disposed to support slices of bread in toasting position between said heating elements.

2. An electric toaster according to claim 1 in which said timing and electrical contact making device is of the electrically triggered kind, and in which an electrical circuit may be completed wherethrough triggering power is supplied to said device upon said manually operable on-off switch being thrown into the "on" condition.

3. An electric toaster according to claim 1 in which said mechanical operating means comprises (1) a setting lever for said timing and electrical contact making device adapted to move from a first extreme position to a second extreme position as said device operates through a toasting and toast discharging period, a portion of this lever being aligned with the plunger element of said electric solenoid operating means in the line of action of this element, and (2) clip means on the end of the solenoid plunger element adjacent said setting lever, this clip means being adapted to (i) become engaged with said setting lever when said plunger element is shifted upon said electric solenoid operating means being energized with said setting lever being in essentially its second extreme position at the end of a toast discharging period, and (ii) pull on said setting lever and move it back to its first extreme position corresponding to the beginning of a toasting period thereby resetting said timing and electrical contact making device as the plunger element is shifted by said spring biasing means upon said electric solenoid operating means being deenergized, said setting lever reaching its first extreme position and said clip means becoming disengaged from this lever before the plunger element of the electric solenoid operating means completes its movement under the influence of said spring biasing means.

References Cited by the Examiner

UNITED STATES PATENTS

| | | | |
|---|---|---|---|
| 1,739,155 | 12/1929 | Lincoln | 99—391 X |
| 1,757,951 | 5/1930 | Breese | 200—136 X |
| 2,465,577 | 3/1949 | Cox | 99—389 X |
| 2,593,642 | 4/1952 | Wolverton | 200—12 |
| 2,644,392 | 7/1953 | Foster | 99—391 X |

CHARLES A. WILLMUTH, *Primary Examiner.*

ROBERT E. PULFREY, STUART E. BECK,
*Assistant Examiners.*